United States Patent

McInnes

[15] 3,703,223
[45] Nov. 21, 1972

[54] VEHICLE SECONDARY BRAKING SYSTEM WITH CONTINUOUS BELT

[72] Inventor: Alexander G. P. McInnes, Indianapolis, Ind.

[73] Assignee: International Research & Development Corporation, Indianapolis, Ind.

[22] Filed: Oct. 2, 1970

[21] Appl. No.: 77,576

[52] U.S. Cl. .................................. 188/5, 188/80
[51] Int. Cl. ........................................ B60t 1/14
[58] Field of Search ........ 188/5, 10, 17, 18 R, 52, 74, 188/361, 80; 180/9.2 R

[56] References Cited

UNITED STATES PATENTS

| | | | |
|---|---|---|---|
| 2,650,679 | 9/1953 | Durkin | 188/5 |
| 2,818,139 | 12/1957 | Sutter | 188/5 UX |
| 2,841,249 | 7/1958 | Allen | 188/5 X |
| 3,062,327 | 11/1962 | Debus | 188/5 |

*Primary Examiner*—Duane A. Reger
*Attorney*—Woodard, Weikart, Emhardt & Naughton

[57] ABSTRACT

A secondary braking system for a vehicle having a continuous belt directly engageable with the ground or pavement. Two brackets fixed to the vehicle frame slidingly engage a carrier body suspended from the frame and vertically movable by hydraulic cylinder motors. The continuous belt is engaged on two drums rotatably mounted to the carrier. Complementary serrations are provided on the two drums and the interior belt surface. A mounting plate fastened to the carrier between the top and bottom portions of the belt supports a master brake cylinder having double piston rods with brake shoes engageable with a smooth portion of each serrated drum.

4 Claims, 4 Drawing Figures

INVENTOR.
ALEXANDER G.P. McINNES
BY
Woodard, Weikart, Emhardt & Naughton
ATTORNEYS

3,703,223

INVENTOR.
ALEXANDER G.P. McINNES
BY
Woodard, Weikart, Emhardt & Naughton
ATTORNEYS

VEHICLE SECONDARY BRAKING SYSTEM WITH CONTINUOUS BELT

BACKGROUND OF THE INVENTION

1. Field of the Invention

This invention relates to a braking system for a vehicle such as a tractor-trailer.

2. Description of the Prior Art

Tractor-trailers are particularly difficult to bring to a stop due to their weight. The present primary braking systems will not quickly bring these vehicles to a halt and are not satisfactory in an emergency stop or when descending a steep hill or mountain. Many systems have been devised for attempting to solve this problem. U.S. Pat. No. 3,005,521 issued to Blain shows a dropable skid for sliding along against the pavement. U.S. Pats. Nos. Pat. issued to Shea, and 2,818,939 issued to Benn, disclose members which are forced between the vehicle tires and pavement. All of these devices operate on the principle of a contact surface member scraping along the ground or pavement thereby gradually slowing the vehicle. The performance of these sliding members vary greatly, since the coefficient of friction of pavement varies with environmental conditions. The primary braking system for a vehicle generally involves tires mounted on brake drums. Rotation of the tire is slowed by braking action on the brake drum; however, the tire frequently slides with respect to the ground due to the small contact area between the tire and the pavement.

From the above background, it can be seen that there is a need for a vehicle secondary braking system which applies a relatively large braking surface to the ground or pavement thereby quickly braking the vehicle. The contact brake surface should not slip with respect to the ground or pavement.

SUMMARY OF THE INVENTION

This invention is a secondary braking system for a vehicle having a wide, continuous belt directly engageable with the ground or pavement. A front and back bracket fixed to the vehicle frame have roller bearings allowing vertical movement of a 5-sided, open-bottomed carrier suspended from the frame by hydraulic cylinder motors. Two drums mounted within the carrier engage the belt which protrudes from the carrier bottom. Complementary serrations are provided on the drums and the inside surface of the belt to prevent slippage of the belt with respect to the drums. Two brake shoes engageable with the drums by a master brake cylinder retard and stop the rotation of the drums.

It is an object of the present invention to provide a vehicle braking system which applies a relatively large contact braking surface to the ground thereby quickly braking the vehicle.

It is an additional object of the present invention to provide a braking system having a contact braking surface which will not slip with respect to the ground surface.

Related objects and advantages of the present invention will be apparent from the following description.

DESCRIPTION OF THE PREFERRED EMBODIMENT

Figure 1:
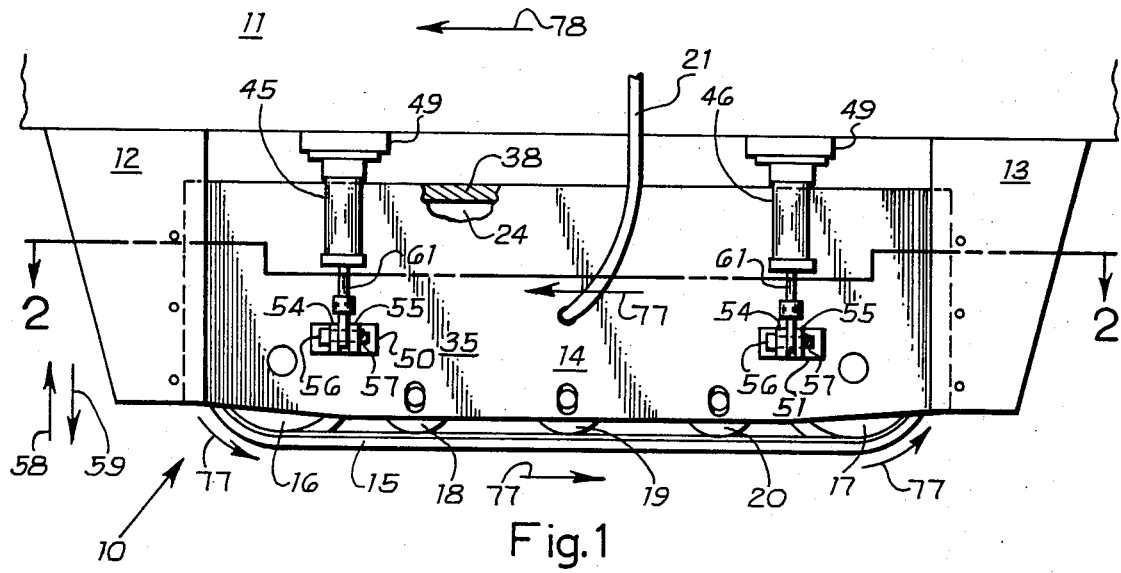
FIG. 1 is a side fragmentary view of a dropable braking system incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring now more particularly to FIG. 1, there is illustrated a braking system 10 which is mounted to the frame 11 of a vehicle such as a tractor-trailer. A front bracket 12 and a back bracket 13 are fixedly mounted to frame 11 by suitable fastening means, such as bolts and nuts. The two brackets are identical and have roller bearings abutting the ends of carrier body 14.

Figure 2:
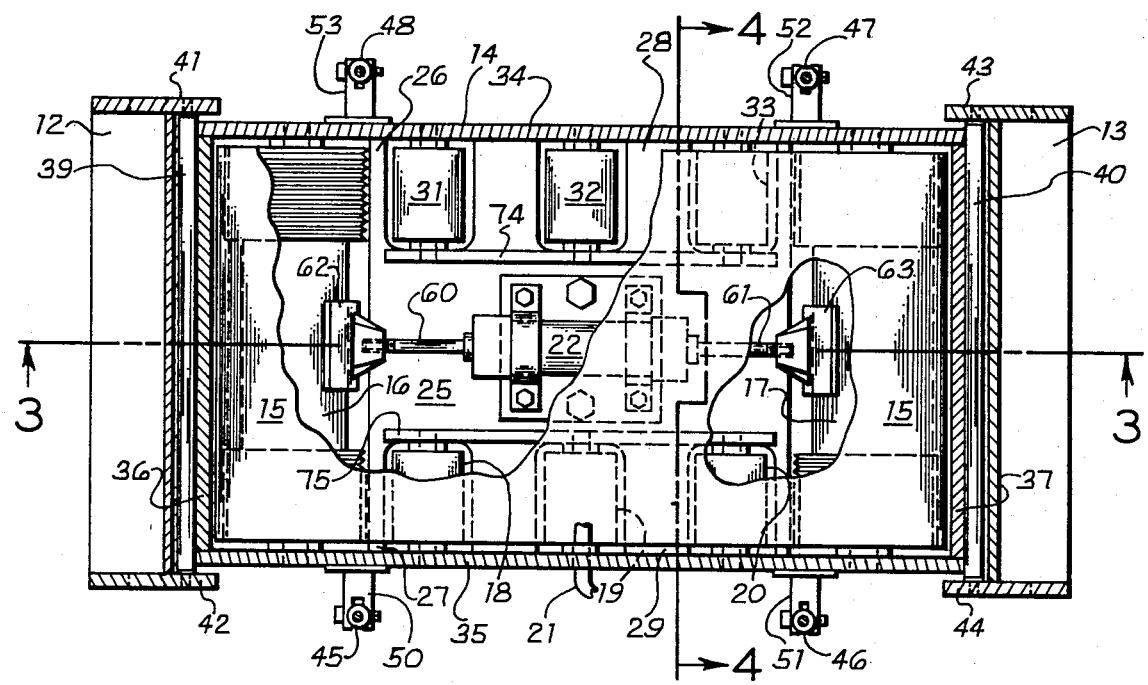
FIG. 2 is a fragmentary section view of the device of FIG. 1 and is taken along the line 2—2 of FIG. 1 and viewed in the direction of the arrows.
Figure 3:
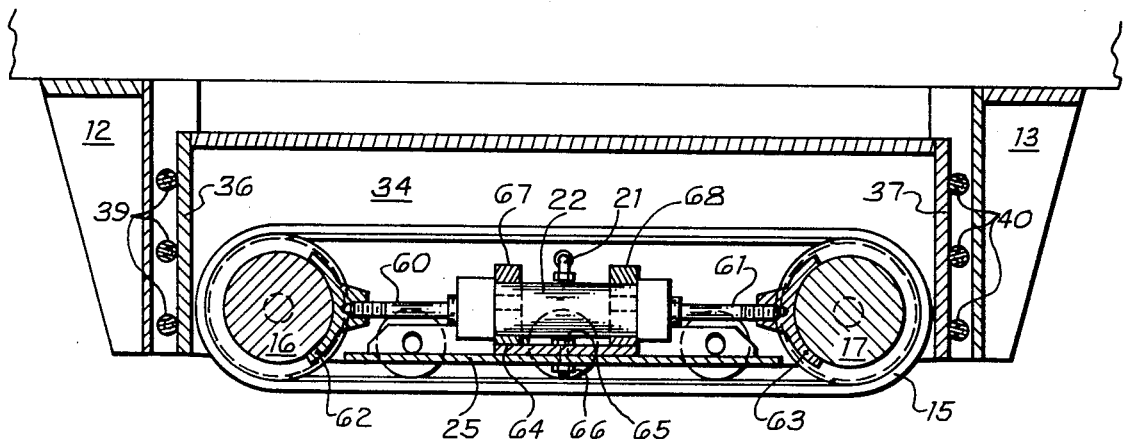
FIG. 3 is a sectional view taken along the line 3—3 of FIG. 2 and viewed in the direction of the arrows.

FIG. 2 is a sectional view of the braking system of FIG. 1 taken along the line 2—2 and viewed in the direction of the arrows. Carrier body 14 is rectangular in configuration, having side walls 34 and 35 and end walls 36 and 37 integrally joined to top wall 38 shown in cutaway area 24 of FIG. 1. Bracket 12 (FIG. 2) has standard roller bearings 39 rotatably mounted to its inwardly disposed flanges 41 and 42. Roller bearings 39 (FIG. 3) slidingly engage the outer surface of end wall 36. Likewise, roller bearings 40 are rotatably mounted to inwardly disposed flanges 43 and 44 (FIG. 2) of back bracket 13 and finally engage the outer surface of end wall 37.

As shown in FIGS. 1 and 2, carrier body 14 is supportedly mounted to hydraulic cylinder motors 45, 46, 47 and 48. Each hydraulic cylinder motor is fixedly mounted to frame 11. Suitable fastening devices, such as bolts and nuts, may be utilized to mount blocks 49 to frame 11 and hydraulic cylinder motors 45 through 48 to blocks 49. Each of these hydraulic cylinder motors has slidable piston rods 61 extending therefrom mounted to brackets 50, 51, 52 and 53 fastened to carrier body 14. Brackets 50 and 51 are mounted to side wall 35 of carrier 14 and each have outwardly disposed arms 54 and 55 spaced apart about the end of a slidable piston rod. Bolts 56 have shanks passing freely through the piston rod and arms 54 and 55 being threadedly received by nuts 57. Brackets 52 and 53 are fastened to side wall 34 and the piston rods of cylinder motors 47 and 48 in a similar manner as described for brackets 50 and 51. Activation of hydraulic cylinder motors 45 through 48 results in vertical movement of carrier 14 sliding on roller bearings 39 and 40. These hydraulic cylinder motors are shown in the drawing as two-way devices for causing movement of carrier 14 in the direction of arrows 58 or 59. It is understood that hydraulic cylinder motors may be provided which upon activation will force carrier 14 only in the direction of arrow 59 with springs provided for returning the carrier to its original position in the direction of arrow 58.

Rotatably mounted to side walls 34 and 35 are two drums 16 and 17 having a continuous externally threaded belt 15 mounted thereon. Conventional ball bearings are provided in side walls 34 and 35 to rotatably receive ends of drums 16 and 17. FIG. 2 shows belt 15 broken away in various areas to more clearly illustrate the braking mechanism. A mounting plate 25 has ears fixedly fastened to side walls 34 and 35 thereby suspending plate 25 within belt 15. For example, ears 26 and 28 are fixedly fastened to side wall 34, whereas ears 27 and 29 are fixedly fastened to side wall 35.

A master braking hydraulic cylinder 22 (FIG. 3) is mounted on a center portion of plate 25 having two outwardly projecting piston rods 60 and 61 with brake shoes 62 and 63 mounted to their ends. Bracket 64 mounted atop plate 25 by bolt 65 and nut 66 has two upstanding arms 67 and 68 fixedly secured to cylinder 22. Hydraulic line 21 is routed from cylinder 22 through a hole in carrier 14 (FIG. 1) to the central source of hydraulic fluid. Application of fluid force via line 21 to the pistons of cylinder 22 results in rods 60 and 61 sliding outward and forcing brake shoes 62 and 63 against drums 16 and 17.

Figure 4:
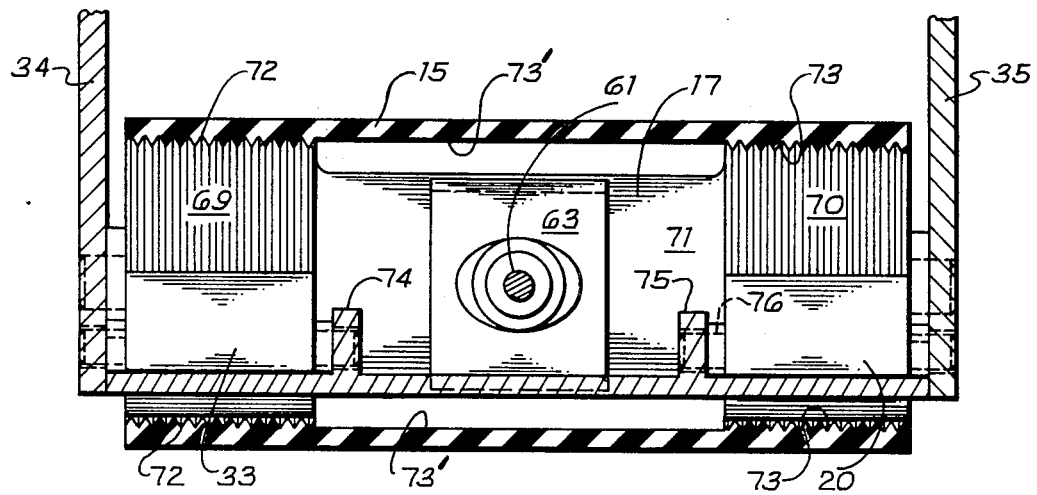
FIG. 4 is a sectional view taken along the line 4—4 of FIG. 2 and viewed in the direction of the arrows, particularly showing the belt arrangement.

FIG. 4 is a sectional view taken along the line 4—4 of FIG. 2 and viewed in the direction of the arrows, showing drum 17 having grooved portions 69 and 70 integrally joined together by necked down brake portion 71. As previously described, drum 17 is rotatably mounted to side walls 34 and 35. Belt 15 is serrated having V-shaped grooves 72 and 73 extending completely around its inner surface. Grooves 72 and 73 are fittingly engaged with V-shaped ridges formed on the surfaces of portions 69 and 70 of drum 17.

Portion 71 of drum 17 does not have V-shaped ridges on its surface and instead is smooth, providing a braking surface receiving shoe 63 fastened to the end of rod 61. Belt 15 has a smooth inner surface 73' between grooved portions 72 and 73 and does not contact portion 71 of drum 17. Drum 18 is identical to drum 17, being rotatably mounted to walls 34 and 35 and having grooved portions for receiving belt 15. Likewise, the center portion of drum 16 is smooth and necked down, providing a braking surface engageable with brake shoe 62. Plate 25 has two upstanding flanges 74 and 75 integrally attached for mounting rollers 18 through 20 and 31 through 33 (FIG. 1). Rollers 18, 19 and 20 are rotatably mounted to flange 75 and side wall 35, whereas rollers 31, 32 and 33 are rotatably mounted to flange 74 and side wall 34. These rollers have necked down ends which are rotatable and slidable in slots provided in walls 34 and 35 and flanges 74 and 75. FIG. 1 illustrates the slots in wall 35 receiving the ends of rollers 18, 19 and 20. FIG. 4 shows roller 20 mounted to wall 35 and flange 75 by rod 76.

To operate braking system 10, hydraulic cylinder motors 45, 46, 47 and 48 are activated, causing carrier 14 (FIG. 1) to move vertically in the direction of arrow 59 until belt 15 contacts the ground or pavement. In the fully downward position, carrier 14 is still engaged by brackets 12 and 13. Assuming the vehicle to be moving in the direction of arrow 78, the ground will force belt 15 to rotate in the direction of arrow 77 thereby causing drums 16 and 17 to rotate in a counterclockwise direction as viewed in FIG. 1. Master brake cylinder 22 is then activated by applying fluid force through line 21 causing shoes 62 and 63 (FIG. 3) to abut and brake drums 16 and 17 until the vehicle comes to a complete stop. Of course, the pressure exerted by shoes 62 and 63 is controlled by controlling the pressure exerted via line 21. Rollers 18 through 20 and 31 through 33 ride atop the inner surface of the bottom portion of belt 15 thereby supporting the belt between drum 16 and 17 and assuring contact of the belt with ground.

Controls for the present braking system are located in the cab of the truck with a control switch for activating hydraulic cylinders 45 through 48 and a foot pedal for operating master brake hydraulic cylinder 22. The foot pedal may be the present conventional foot pedal or may be an additional foot pedal. The braking system may be utilized as a parking brake, an emergency stopping brake, or when descending a large hill or mountain. The present braking system may be used on vehicles other than tractor-trailers, such as automobiles. The relatively large contacting area of belt 15 provides superior braking capability when compared to the existing brake systems. The present invention may also be utilized as a positive driving means on snow, ice, mud, etc. Drum 16 and/or 17 may be driven by the truck engine via a gear box thereby applying a large contacting area to the slick surface and driving the vehicle. Many other variations of the present braking system are contemplated and included in the present invention. For example, the brake shoe-drum combination illustrated and described in this specification may be replaced with a disk-shoe brake arrangement.

It will be obvious from the above description that the present invention provides a secondary braking system for a vehicle which applies a relatively large braking surface to the ground or pavement thereby quickly braking the vehicle. It will be further obvious from the above description that the present braking system has a contact braking surface which will not slip with respect to the ground or pavement thereby losing braking ability.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A braking system for a vehicle comprising:
   a frame movably mounted to said vehicle;
   means mounted on said vehicle and connected to said frame being operable to raise and lower said frame;
   a pair of drums rotatably mounted to said frame, said drums having outer surfaces;
   a continuous belt mounted on said drums and directly engageable with the road when said frame is lowered; and a fluid cylinder mounted to said frames between said drums, said cylinder having opposite ends and piston rods extending through said ends with brake shoes thereon abuttable against said outer surfaces of said drums for the braking thereof.

2. The braking system of claim 1 wherein:

each of said drums includes a center smooth portion of reduced diameter which receives one of said brake shoes, each of said drums has a plurality of ridges extending circumferentially therearound on either side of said center portion; and, said belt includes a plurality of grooves fittingly receiving and complementary to said ridges.

3. The braking system of claim 2 and further comprising:

a plurality of rollers rotatably mounted to said frame between said drums supporting said belt between said drums, said rollers contacting the inside surface of said belt.

4. The braking system of claim 3 wherein:

said vehicle includes a pair of opposed brackets, each of said brackets has a roller bearing mounted thereto which bearingly receives said frame.

* * * * *

UNITED STATES PATENT OFFICE
CERTIFICATE OF CORRECTION

Patent No. 3,703,223      Dated November 21, 1972

Inventor(s) Alexander G. P. McInnes

It is certified that error appears in the above-identified patent and that said Letters Patent are hereby corrected as shown below:

Column 1, Line 16

Delete "Nos. Pat." and insert -- 3,078,963 -- .

Signed and sealed this 15th day of May 1973.

(SEAL)
Attest:

EDWARD M. FLETCHER, JR.
Attesting Officer

ROBERT GOTTSCHALK
Commissioner of Patents